United States Patent Office 3,477,193
Patented Nov. 11, 1969

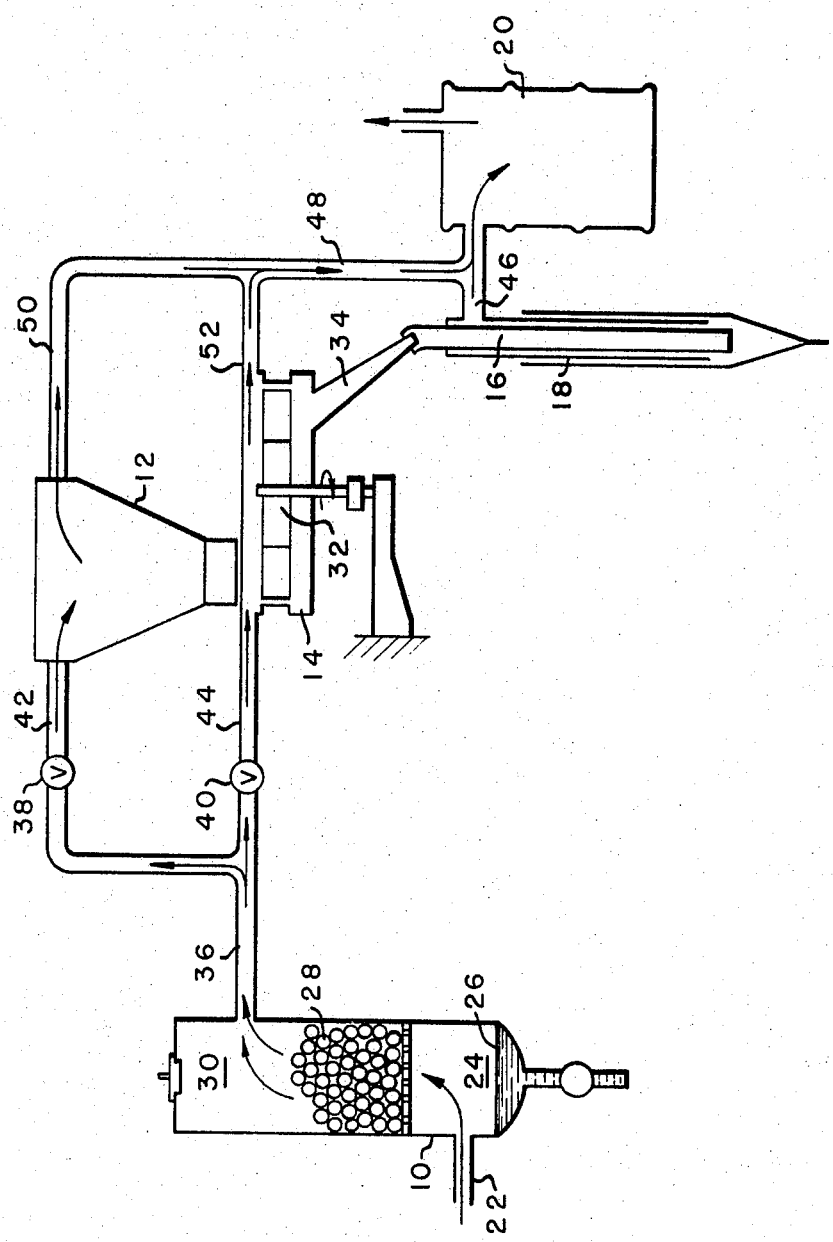

3,477,193
AIR DRYER
George A. Mobley, Spartanburg, S.C., assignor to Clemson Industries, Inc., White Stone, S.C., a corporation of Delaware
Filed July 10, 1967, Ser. No. 652,323
Int. Cl. B65b 31/02
U.S. Cl. 53—22
3 Claims

ABSTRACT OF THE DISCLOSURE

Method to provide a controlled atmosphere in a packaging process independent of the surrounding area by introducing dry sterile air into the system and maintaining the system at substantially atmospheric pressure so that it is substantially in equilibrium with the surrounding atmosphere.

---

This invention relates generally to the filling and packaging of dry products and more particularly to a method of filling and packaging a very hygroscopic dry, granular material.

Dry, hygroscopic granular material must be packaged under conditions which are not necessary for other dry materials to be packaged. Generally, dry hygroscopic granular material must be handled in an extremely dry atmosphere or must be kept hot. When using a packaging machine such as that shown in U.S. Patent 3,320,721 which packages the product in heat sealed plastic packets, it is not possible to maintain the material to be packaged at elevated temperatures and at the same time obtain a satisfactory heat sealed package of the desired material. Therefore, it is necessary to provide an extremely dry atmosphere, but such atmosphere must be provided in the packaging system since it would be very unsatisfactory to maintain the total handling area in a dry atmospheric condition to handle a hygroscopic granular material due to the cost of doing so, uncomfortable working conditions for personnel and the creation of a condition where dusting is a problem.

Therefore, it is an object of the invention to provide a method of controlling the atmospheric condition of a filling system for a solid or semi-solid product.

A second object of the invention is to provide a controlled atmosphere and to prevent uncontrolled dusting of a hygroscopic, dust laden product during handling in bulk and packaging.

Another object of the invention is to provide a method of supplying dry sterile air to a product handling system and maintaining a controlled atmosphere therein while packaging a hygroscopic granular material.

A still further object of the invention is to provide an efficient method of packaging a hygroscopic granular material.

Other objects and advantages of the invention will become readily apparent as the specification proceeds to describe the invention with reference to the accompanying drawing which schematically represents the preferred method of the invention.

Looking now at the drawing, there is shown an enclosed system which is as air tight as possible and incorporates as major components a dryer 10, a filler 12 for hygroscopic granular material, an indexing machine 14 to transfer product from the filler to the fill tube 16 of convention packaging machine 18, which is preferably of the type which provides heat sealed plastic packets filled with product, and a source of negative pressure 20 which can be of any suitable type such as a vacuum pump.

The dryer 10 preferably is the type which provides three stages of drying. Air or gas under pressure is introduced into the inlet 22 where it expands into the pre-drying chamber 24 where due to the sudden expansion larger moisture droplets and heavier microscopic solid particles will drop into the condensate 26. Further, the pre-drying chamber 24 will contain a desiccant mist formed by the deliquescence of the bed 28 above which will act as a chemical barrier to finer particles of vapor which will be absorbed by the mist and also drop into the condensate 26. The air then flows upward in a slow scrubbing action between the pills or tablets in the bed 28 which are kept moist by their deliquescence due to absorption of moisture. This moisture dissolves the tablets very slowly and gradually liquifies the desiccant bed 28. The liquid formed absorbs and virtually removes all remnants of vapor in the entering gas or air and will drop down through the pre-drying chamber 24 into the condensate 26. The dry clean, sterile and non-toxic air will accumulate in the plenum chamber 30 and then pass into the system.

The material filler 12 and indexer 14 can be of any suitable commercially available type and as schematically represented shows an indexing wheel 32 which periodically receives fill material from the filler 12 and at predetermined times is rotated to supply fill material to the fill tube 16 via chute feed 34 while another portion of the indexing wheel is receiving fill material from the filler 12.

As discussed above, the preferred method is directed to packaging a dry hygroscopic granular material which must be kept dry to prevent caking and/or deliquescence and from which dust must be controlled. To this end, air under considerable pressure is introduced into the inlet 22 of the dryer 10 and emerges at substantially the entering pressure in conduit 36 as dry, non-toxic air. Then this air is bled through suitable control valves 38 and 40 in very low volumes and at very low pressures via conduits 42 and 44 into all areas where the dry hygroscopic granular material comes into contact with air. Since the air is being introduced into these areas at a positive pressure the vacuum source 20 is in communication with these areas via suction conduits 46, 48, 50 and 52 to prevent the ejection of dust through small openings that may exist in the system. The suction pressure is of such a volume that the pressure in the product areas is essentially the same as the surrounding outside atmosphere around the system so that any dust or fumes arising from the product are entrained in the air flow and removed by the vacuum pump 20. Furthermore, since the pressure in the system is substantially the same as the surrounding area there is no ingress of moist and/or contaminated air into the system to contaminate the product or cause caking, and there is no egress of dust from the product to the outside surrounding area because the differential pressure between the inside and the outside is substantially zero.

As pointed out, the preferred embodiment is directed to a system which is packaging a dry hygroscopic granular material such as caustic soda which readily absorbs moisture as well as being dust forming, but it is contemplated that the disclosed system can be used to package any product for which it is necessary to control the atmosphere therein. For example, it is very conceivable that a saturated air system could be used for efflorescent type products to prevent drying. Furthermore, it is contemplated that gases other than air can be employed if it is desired.

It is obvious that the disclosed method provides a closed packaging system which has a controlled atmosphere which does not allow ingress or egress of foreign matter which will interfere with the packaging of the desired product. Furthermore, such method is relatively simple and can be readily manufactured and installed at a nominal cost.

Although I have described in detail the preferred embodiment of my invention, I contemplate that many changes may be made without departing from the scope or spirit of my invention and I desire to be limited only by the claims.

That which is claimed is:

1. A method of packaging a substantially solid particulate material in a closed system comprising the steps of: supplying a gas under pressure into said system, treating said gas to place it in a predetermined condition, supplying material to be packaged into said system, supplying said material to a packaging machine, packaging said material and equalizing the pressure in said system to the pressure surrounding said system by sucking gas therefrom.

2. The method of claim 1 wherein said material is hygroscopic and said gas is air, said treating step being drying said air.

3. The method of claim 1 wherein said material is of the efflorescent type and said gas is air, said air being saturated during the treatment step.

References Cited
UNITED STATES PATENTS

| | | | |
|---|---|---|---|
| 2,113,636 | 4/1938 | Vogt | 53—112 X |
| 2,224,284 | 12/1940 | Barnett | 53—22 X |

TRAVIS S. McGEHEE, Primary Examiner

U.S. Cl. X.R.

53—79, 112